United States Patent
Stepan et al.

(10) Patent No.: US 12,275,312 B2
(45) Date of Patent: Apr. 15, 2025

(54) NETWORK FOR SUPPLYING AN OPERATING VOLTAGE FOR AN ELECTRIC VEHICLE, ELECTRIC VEHICLE AND METHOD FOR SUPPLYING AN OPERATING VOLTAGE

(71) Applicant: ZF FRIEDRICHSHAFEN AG, Friedrichshafen (DE)

(72) Inventors: Zbynek Stepan, Plzen (CZ); Frank Seemann, Euerbach (DE); Andre Ehrsam, Bergrheinfeld (DE); Martin Mach, Plzen (CZ); Vladimir Dvorak, Plzen (CZ); Gabriel Scherer, Deggenhausertal (DE); Tato Gervais Amani, Nuremberg (DE); Matthias Engicht, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 401 days.

(21) Appl. No.: 17/725,098

(22) Filed: Apr. 20, 2022

(65) Prior Publication Data
US 2022/0340019 A1   Oct. 27, 2022

(30) Foreign Application Priority Data

Apr. 21, 2021  (DE) ............... 10 2021 203 968.5

(51) Int. Cl.
*B60L 50/51*   (2019.01)
*H02P 1/26*    (2006.01)
*H02P 27/06*   (2006.01)

(52) U.S. Cl.
CPC ............... *B60L 50/51* (2019.02); *H02P 1/26* (2013.01); *H02P 27/06* (2013.01); *H02P 2207/01* (2013.01)

(58) Field of Classification Search
CPC .. B60L 50/51; H02P 1/26; H02P 27/06; H02P 2207/01

See application file for complete search history.

(56) References Cited

U.S. PATENT DOCUMENTS

2010/0032275 A1* 2/2010 Meier .................... H01H 9/548
                                                200/502
2019/0241091 A1* 8/2019 Lee .......................... B60L 7/14

FOREIGN PATENT DOCUMENTS

DE          600 28 110       12/2006
DE     10 2019 201 661        8/2019
(Continued)

OTHER PUBLICATIONS

Office Action issued on Nov. 2, 2021 in corresponding DE Application No. 10 2021 203 968.5.

*Primary Examiner* — Zoheb S Imtiaz
(74) *Attorney, Agent, or Firm* — COZEN O'CONNOR

(57) ABSTRACT

A network of an electric vehicle has an energy supply interface, an inverter, an energization interface and a soft starter. The inverter has a first inverter connection configured to connect the inverter to the energy supply interface and a second inverter connection configured to connect the inverter to the energization interface and the soft starter. The inverter is configured to convert a DC voltage applied to the first inverter connection to an AC voltage and to supply same at the second inverter connection. The soft starter is configured to reduce an input voltage applied to the first soft starter connection and to supply the operating voltage, which is reduced compared to the input voltage, at the second soft starter connection.

14 Claims, 3 Drawing Sheets

(56) References Cited

FOREIGN PATENT DOCUMENTS

| WO | WO 2008/071134 | 6/2008 |
| WO | WO 2020/114816 | 6/2020 |

\* cited by examiner

NETWORK FOR SUPPLYING AN OPERATING VOLTAGE FOR AN ELECTRIC VEHICLE, ELECTRIC VEHICLE AND METHOD FOR SUPPLYING AN OPERATING VOLTAGE

BACKGROUND OF THE INVENTION

1. Field of the Invention

The present approach relates to a network for supplying an operating voltage for an electric vehicle, to an electric vehicle and to a method for supplying an operating voltage.

2. Description of the Related Art

In the industry, electrified driving as part of being environmentally friendly is becoming increasingly more important, with the aim of electrically driving not only passenger vehicles but also commercial vehicles.

SUMMARY OF THE INVENTION

Against this background, the present invention provides an improved network for supplying an operating voltage for an electric vehicle, an improved electric vehicle and an improved method for supplying an operating voltage according to the main claims. Advantageous refinements emerge from the dependent claims and from the description which follows.

The advantages that can be achieved using the approach presented include providing a network for an electric vehicle that can be realized inexpensively and with a low number of components and in which a uniform, for example surge-free, operating energy is provided for an additional drive of the electric vehicle.

A network for supplying an operating voltage for an electric vehicle is presented. The network has an energy supply interface, an inverter, an energization interface and a soft starter. The energy supply interface is formed for connecting the network to a vehicle battery and/or a vehicle fuel cell of the electric vehicle. The inverter has a first inverter connection for connecting the inverter to the energy supply interface and a second inverter connection for connecting the inverter to the energization interface and to the soft starter. The inverter is configured to convert a DC voltage applied to the first inverter connection to an AC voltage and to supply same at the second inverter connection. The energization interface serves to energize a unit which is connected to the energization interface. The soft starter has a first soft starter connection for connecting the soft starter to the second inverter connection and a second soft starter connection for connecting the soft starter to an additional drive of the electric vehicle. The soft starter is configured to reduce an input voltage applied to the first soft starter connection and to supply the operating voltage, which is reduced compared to the input voltage, at the second soft starter connection.

The operating voltage can be used, for example, to operate the additional drive when it is electrically connected to the second soft starter connection. The soft starter enables a targeted reduction in the start-up current for the additional drive associated with a continuous and surge-free increase in torque. By reducing the motor voltage, the soft starter can also be used to control the run-down of the three-phase motor. Thanks to the soft starter, just a single joint inverter can also be used both for the additional drive and the energization interface. Advantages are thus on the one hand a reduction in components for the network and on the other hand the use of the advantageous soft starter.

The network can comprise the additional drive for operating an additional function of the electric vehicle using the operating voltage, wherein the additional drive is or can be electrically connected to the second soft starter connection via a drive interface. The additional drive can be configured for example to provide a functionality that goes beyond the progressive movement of the electric vehicle. For example, the additional drive can be used to drive a tool such as an excavator shovel or a crane of the electric vehicle as the additional function.

According to one embodiment, the soft starter can be integrated into the additional drive. For example, the soft starter and the additional drive can be accommodated in a joint housing. The soft starter and the additional drive can thus be realized conveniently as a module component for the electric vehicle.

It is furthermore advantageous when the network according to one embodiment has a switch, which is electrically connected between the second inverter connection and the first soft starter connection and is configured to establish and/or to disconnect an electrical connection between the inverter and the soft starter. For example, the switch, which can be a bank of switches, can be contact-connected directly to the first soft starter connection. This makes it possible to output the operating voltage only when required.

In addition or as an alternative, the network can also have a further switch, which is electrically connected between the second inverter connection and the energization interface and is configured to establish and/or to disconnect an electrical connection between the inverter and the energization interface. This makes it possible to supply the AC voltage at the energization interface for the unit for example only when required.

According to one embodiment, the network can also have a controller, which is configured to output an opening signal for opening at least one switch of the switch to electrically disconnect the first soft starter connection from the second inverter connection. In addition or as an alternative, the controller can be configured to output a closing signal for closing the switch to electrically connect the first soft starter connection to the second inverter connection. The controller can also be configured to output the opening signal, which also causes at least one further switch to open, to electrically disconnect the energization interface from the second inverter connection. In addition or as an alternative, the controller can be configured to output the closing signal for also closing the further switch to electrically connect the energization interface to the second inverter connection. to be able to actuate the switch and the further switch independently of one another, the controller can alternatively be configured to output a further opening signal for opening at least the further switch to electrically disconnect the energization interface from the second inverter connection and/or to output a further closing signal for closing the further switch to electrically connect the energization interface to the second inverter connection. The voltage can advantageously be led on the shortest path through the switch to the first soft starter connection and/or the energization interface by the switches. Thanks to the controller, the supply of the operating voltage and/or the AC voltage can be controlled or regulated, for example depending on whether the operating voltage is currently required to operate the additional drive and/or whether the AC voltage is currently required at the energization interface. For example, it may be possible for a driver of the electric vehicle to supply an operator control signal from a driver cabin of the electric vehicle using an operator controller, said operator control signal being able to be used by the controller of the network to control the switch and/or further switch.

The first soft starter connection can have at least one phase having at least one anti-parallel circuit composed of two diodes. A uniform output of the operating voltage for the additional drive is possible using two diodes arranged opposite one another and connected in parallel.

The first soft starter connection can also have three phases each having an anti-parallel circuit composed of two diodes. It is thus possible to supply the operating voltage for operating for example a three-phase motor as additional drive.

As an alternative, the first soft starter connection can have at least one phase having at least one anti-parallel circuit composed of two thyristors. Using the thyristors makes it possible to perform phase gating for example to regulate the torque of the additional drive which is formed as an AC motor. During the phase gating, the flow of current through the anti-parallel circuit of the two thyristors is controlled. After the zero crossing of the AC voltage (and the current), the thyristors do not conduct the current until they receive an ignition pulse; from this time, that is to say this "phase" of the AC signal, the additional drive is supplied with energy until the next zero crossing. The later the thyristors are ignited, the lower the average power. The first soft starter connection can also have three phases each having an anti-parallel circuit composed of two thyristors.

The network can also have the vehicle battery and in addition or as an alternative the vehicle fuel cell, which is electrically contact-connected to the energy supply interface. It is possible to supply DC voltage for the network using the vehicle battery and/or the vehicle fuel cell. The vehicle battery or vehicle fuel cell can be configured to supply a nominal voltage of 650 volts DC.

According to one embodiment, the energization interface can be electrically connected to at least one single-phase connection plug and/or at least one single-phase socket. For example, an AC voltage of 230 volts in a frequency range between 50 hertz and 60 hertz can be supplied for the unit via the single-phase connection plug and/or an AC voltage of 230 volts in a frequency range between 50 hertz and 60 hertz can be fed by the unit into the network via the single-phase socket. The energization interface can also be electrically connected to an arbitrary number, for example a total of three, of such single-phase connection plugs or sockets. It is thus possible to connect more units to the energization interface.

In addition or as an alternative, the energization interface can be electrically connected to at least one three-phase connection plug and/or at least one three-phase socket. For example, an AC voltage of 400 to 600 volts in a frequency range between 50 hertz and 60 hertz can be supplied for the or a further unit via the three-phase connection plug. An AC voltage of 400 to 600 volts in a frequency range between 50 hertz and 60 hertz can also be fed into the network via the three-phase socket. The energization interface can also be electrically connected to an arbitrary number, for example a total of three, of such three-phase connection plugs or sockets. It is thus possible to connect more units to the energization interface.

Furthermore, an electric vehicle is presented, which has a network in one of the variants described above and the vehicle battery and/or vehicle fuel cell which is electrically connected to the energy supply interface. The electric vehicle can be realized for example as an electrified commercial vehicle, for example as a lorry. A power supply grid of the electric vehicle for supplying an AC voltage for an energization interface and supplying a uniform operating energy for example for an additional drive is advantageously realized with a low number of components, inexpensively and still in a functional manner.

A method for supplying an operating voltage for an electric vehicle described above comprises a conversion step and a reduction step. In the conversion step, a DC voltage applied to the first inverter connection is converted to an AC voltage and supplied at the second inverter connection. In the reduction step, an input voltage applied to the first soft starter connection is reduced and the operating voltage, which is reduced compared to the input voltage, is supplied at the second soft starter connection.

In the conversion step, the AC voltage supplied at the second inverter connection can also be supplied at the energization interface which is electrically connected to the second inverter connection and/or the first soft starter connection which is electrically connected to the second inverter connection.

This method can be implemented for example in software or hardware or in a mixed form of software and hardware, for example in a controller.

Other objects and features of the present invention will become apparent from the following detailed description considered in conjunction with the accompanying drawings. It is to be understood, however, that the drawings are configured solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the approach presented here are illustrated in the drawings and explained in more detail in the description which follows. In the drawings.

DETAILED DESCRIPTION OF THE PRESENTLY PREFERRED EMBODIMENTS

In the following description of preferred exemplary embodiments of the present approach, identical or similar reference signs are used for the elements with a similar effect illustrated in the various figures, wherein a repeated description of these elements is omitted.

Figure 1:
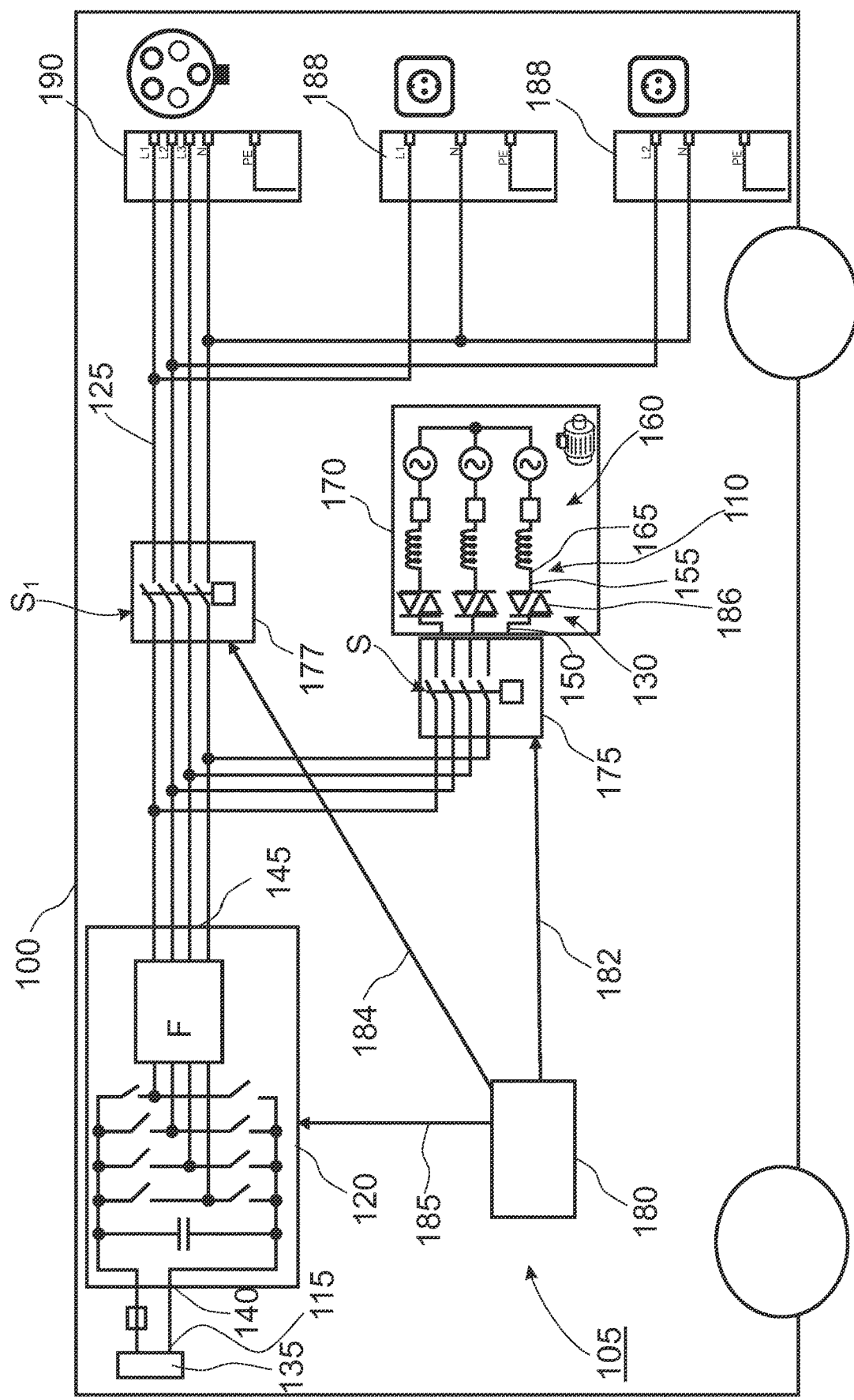
FIG. 1 shows a schematic illustration of an electric vehicle having a network for supplying an operating voltage according to an exemplary embodiment.

FIG. 1 shows a schematic illustration of an electric vehicle 100 having a network 105 for supplying an operating voltage 110 according to an exemplary embodiment. The network 105 can thus constitute an energy supply network of the electric vehicle 100.

According to this exemplary embodiment, the network 105 is accommodated in or on the electric vehicle 100 purely by way of example. According to this exemplary embodiment, the electric vehicle 100 is realized for example as an electrified commercial vehicle, for example as a lorry.

The network 105 has an energy supply interface 115, an inverter 120, an energization interface 125 and a soft starter 130. The energy supply interface 115 is formed for connecting the network 105 to a vehicle battery 135 and/or a vehicle fuel cell of the electric vehicle 100. The vehicle battery 135 and/or the vehicle fuel cell can be provided to supply an energy required to move the electric vehicle 100 along.

The inverter 120 has on the one hand a first inverter connection 140 for connecting the inverter 120 to the energy supply interface 115 and on the other hand a second inverter connection 145 for connecting the inverter 120 to the energization interface 125 and to the soft starter 130. The inverter 120 is used to convert a DC voltage applied to the first inverter connection 140 to an AC voltage and to supply same at the second inverter connection 145. The AC voltage supplied by the inverter 120 can be supplied via the energization interface 125 and in addition or as an alternative can be used by the soft starter 130.

According to one exemplary embodiment, the inverter 120 has at least one bridge circuit composed of a plurality of transistors. The inverter 120 optionally has a filter F at the second inverter connection 145 and an intermediate circuit capacitor at the first inverter connection 140.

The energization interface 125 is formed to energize a unit via the second inverter connection 145. The unit may be a unit arranged externally of the electric vehicle 100, said unit not being part of the electric vehicle 100.

The soft starter 130 has a first soft starter connection 150 for connecting the soft starter 130 to the second inverter connection 145 and a second soft starter connection 155 for connecting the soft starter 130 to an additional drive 160 of the electric vehicle 100. The soft starter 130 is configured to reduce an input voltage applied to the first soft starter connection 150 and to supply the operating voltage 110, which is reduced compared to the input voltage, at the second soft starter connection 155. To this end, the soft starter 130 comprises a suitable circuit.

According to one exemplary embodiment, the network 105 also comprises the additional drive 160, which is configured to operate an additional function of the electric vehicle 100 using the operating voltage 110, wherein the additional drive 160 is or can be electrically connected to the second soft starter connection 155 via a drive interface 165. According to one exemplary embodiment, the additional drive 160 is configured to provide a functionality that goes beyond the progressive movement of the electric vehicle 100. For example, the additional drive 160 can be used to drive an excavator shovel or a crane of the electric vehicle 100 as the additional function. According to one exemplary embodiment, the soft starter 130 is integrated into the additional drive 160. In this case, according to one exemplary embodiment, the soft starter 130 and the additional drive 160 are accommodated in a joint housing 170.

According to one exemplary embodiment, the network 105 also has a switch bank175, which is electrically connected between the second inverter connection 145 and the first soft starter connection 150 and is configured to establish and/or to disconnect an electrical connection between the inverter 120 and the soft starter 130. According to one exemplary embodiment, the switch bank175 is contact-connected directly to the first soft starter connection 150. Furthermore, according to this exemplary embodiment, the network 105 has a further switch bank177, which is electrically connected between the second inverter connection 145 and the energization interface 125 and is configured to establish and/or to disconnect an electrical connection between the inverter 120 and the energization interface 125.

According to one exemplary embodiment, the network 105 also has a controller 180, which is configured to output an opening signal 182 for opening at least one switch S of the switch bank175 to electrically disconnect the first soft starter connection 150 from the second inverter connection 145 and/or to output a closing signal for closing the switch S to electrically connect the first soft starter connection 150 to the second inverter connection 145. According to an alternative exemplary embodiment, the controller 180 is also configured to output the opening signal 182, which also causes at least one further switch $S_1$ of the further switch bank177 to open, to electrically disconnect the energization interface 125 from the second inverter connection 145 and/or to output the closing signal for also closing the further switch $S_1$ to electrically connect the energization interface 125 to the second inverter connection 145. However, to be able to actuate the switch S and the further switch $S_1$ independently of one another, according to this exemplary embodiment, the controller 180 is configured to output a further opening signal 184 for opening at least the further switch $S_1$ of the further switch bank177 to electrically disconnect the energization interface 125 from the second inverter connection 145 and/or to output a further closing signal for closing the further switch $S_1$ to electrically connect the energization interface 125 to the second inverter connection 145. According to one exemplary embodiment, it is possible for a driver of the electric vehicle 100 to supply an operator control signal from a driver cabin of the electric vehicle 100 using an operator controller, said operator control signal being able to be used by the controller 180 of the network 105 to control the switch bank175 and/or further switch bank177. According to this exemplary embodiment, the further switch bank177 is contact-connected directly to the energization interface 125. According to an alternative exemplary embodiment, each of the controllers has its own dedicated controller for actuating the corresponding switch S, $S_1$.

According to one exemplary embodiment, the inverter 120 is configured to convert the DC voltage applied to the first inverter connection 140 to the AC voltage and to supply same at the second inverter connection 145 in response to an inverter signal 185. According to one exemplary embodiment, the controller 180 is configured to supply the inverter signal 184. According to one exemplary embodiment, the inverter 120 is also configured to convert an AC voltage applied for example to the energization interface 125 to a DC voltage and to supply same at the first inverter connection 140. In this case, the controller 180 is configured for example to supply a further inverter signal, by way of which the inverter 120 is actuated to convert the AC voltage to the DC voltage. According to one exemplary embodiment, the inverter 120 is configured as a bidirectional inverter for this purpose.

According to one exemplary embodiment, the first soft starter connection 150 has three phases each having an anti-parallel circuit composed of two diodes 186. It is thus possible to supply the operating voltage 110 for operating for example a three-phase motor as additional drive 160. According to an alternative exemplary embodiment, the first soft starter connection 150 has only one or another number of phases each having at least one anti-parallel circuit composed of two diodes 186. According to an alternative exemplary embodiment, the first soft starter connection 150 has at least one phase, or for example three phases, (each) having at least one anti-parallel circuit composed of two thyristors.

According to this exemplary embodiment, the switch bank 175 has in each case one of the switches S for each of the three phases of the first soft starter connection 150 and for a zero phase, that is to say a total of four of the switches S. According to one exemplary embodiment, the switches S can be operated synchronously by the opening signal and/or closing signal.

According to one exemplary embodiment, the network 105 also has the vehicle battery 135 and/or vehicle fuel cell, which is electrically contact-connected to the energy supply interface 115. According to this exemplary embodiment, the DC voltage can be supplied for the network 105 using the vehicle battery 135 and/or vehicle fuel cell. According to one exemplary embodiment, the vehicle battery 135 or vehicle fuel cell is configured to supply a nominal voltage of 650 volts DC.

According to one exemplary embodiment, the energization interface 125 is electrically connected to at least one connection 188 for supplying an AC voltage, for example a single-phase AC voltage. In this case, the at least one single-phase connection 188 can be part of the network 105. For example, the connection 188 comprises a socket.

According to one exemplary embodiment, an AC voltage of 230 V in a frequency range between 50 hertz and 60 hertz can be supplied for the unit via the connection 188. An AC voltage of 230 volts in a frequency range between 50 hertz and 60 hertz can optionally be fed into the network 105 via the connection 188. According to this exemplary embodiment, the energization interface 125 is also electrically connected to a further connection 188 purely by way of example. According to an alternative exemplary embodiment, the energization interface 125 is connected to an arbitrary number, for example a total of three, of such connections 188, which are each embodied for example as sockets.

According to one exemplary embodiment, the energization interface 125 is also electrically connected to a three-phase connection 190, for example in the form of a three-phase socket. An AC voltage of 400 to 600 volts in a frequency range between 50 hertz and 60 hertz can be supplied for the or a further unit via the three-phase connection 190. An AC voltage of 400 to 600 volts in a frequency range between 50 hertz and 60 hertz can optionally be fed by the unit into the network 105 via the three-phase connection 190. According to an alternative exemplary embodiment, the energization interface 125 is electrically connected to an arbitrary number, for example a total of three, of such three-phase connections 190.

According to this exemplary embodiment, the further switch bank 177 has in each case one of the further switches $S_1$ for each of the three phases of the three-phase connection 190 and for a zero phase, that is to say a total of four of the further switches $S_1$. According to one exemplary embodiment, the further switches $S_1$ can be operated synchronously by the further opening signal and/or further closing signal.

The network 105 presented here advantageously makes it possible to use phase gating with a soft starter of a locally limited electricity grid, which can also be referred to as an island network or "microgrid", for driving, controlling and/or operating an electric vehicle 100.

According to one exemplary embodiment, a unit combination of soft starter 130 with additional drive 160, which according to this exemplary embodiment is formed as an electric motor, is provided within the context of a vehicle function of the electric vehicle 100. The operating voltage 110 for the switch-on current in the case of the soft starter 130 is advantageously substantially lower than in the case of a direct motor start without a soft starter 130. According to one exemplary embodiment, the soft starter 130 is a standard soft start-up unit, which cannot be used in an industrial environment but can be used in an electric vehicle 100 with all additional properties that are required for this environment. The approach presented here additionally involves not using the DC intermediate circuit to drive the electric motor.

Advantages of the network 105 presented here are cost savings as well as savings in terms of components and installation space compared to a network without the soft starter 130.

According to one exemplary embodiment, the utilization and function of the additional drive 160 determine the control of the additional drive 160, which according to this exemplary embodiment is formed as an asynchronous machine.

For example, compared to a delta-star switch, the soft starter 130 has the advantage that the switch-on current for the additional drive 160 is lower, which allows the motor to run more quietly.

A very large advantage of the network 105 is also that the simultaneous use of the motor function and of the island network for example at the energization interface 125 is made possible using just one inverter 120. A frequency conversion instead of the soft starter 130 would result for example in large disturbances in the island network.

According to one exemplary embodiment, the network 105 presented here comprises the soft starter 130 and what is known as a microgrid with three phases and/or one phase at for example 50 Hz/60 Hz. According to one exemplary embodiment the microgrid (400 VAC/50 Hz) represents an electricity grid with an AC voltage: 1×0 . . . 230 V±15% or 3×0 . . . 230 V or 3×0 . . . 400 V±15%, for example in a frequency range of: 50 Hz±10% or 60 Hz±10%.

Figure 2:
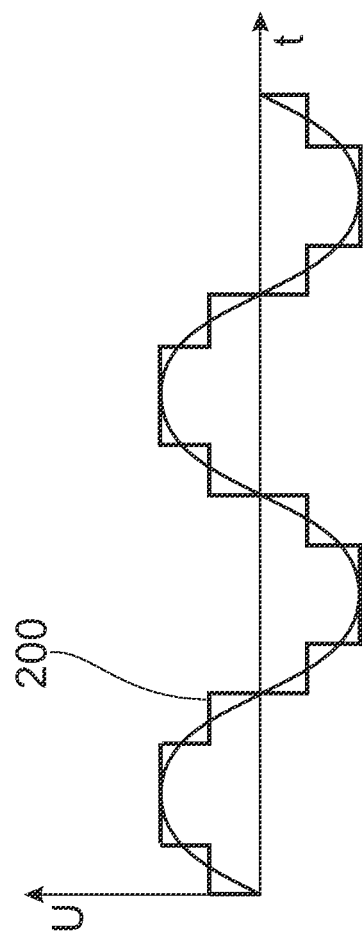
FIG. 2 shows a voltage profile at a phase of a second inverter connection of an inverter of a network according to one exemplary embodiment.

FIG. 2 shows a voltage profile 200 at a phase of a second inverter connection of an inverter of a network according to one exemplary embodiment. This may be the network described in FIG. 1. According to this exemplary embodiment, it is shown how the U/t characteristic curve at the output of the inverter looks schematically. In this case, the voltage profile 200 follows a sinusoidal curve in steps.

Figure 3:
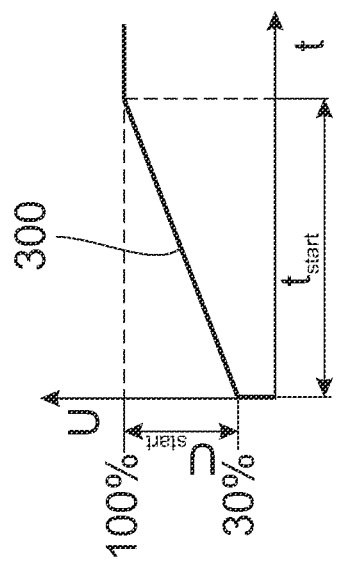
FIG. 3 shows a further voltage profile at a phase of a second soft starter connection of a soft starter of a network according to one exemplary embodiment.

FIG. 3 shows a further voltage profile 300 at a phase of a second soft starter connection of a soft starter of a network according to one exemplary embodiment. This may be the network with the soft starter comprising diodes described in FIG. 1. According to this exemplary embodiment, grid loading upon start-up is advantageously low to average thanks to the soft starter. A soft torque profile for the additional drive is thus made possible. The voltage profile 300 increases in jumps starting from 0 V up to approximately 30% of the final voltage and subsequently increases linearly during a start-up time $t_{start}$ up to 100% of the final voltage.

Figure 4:
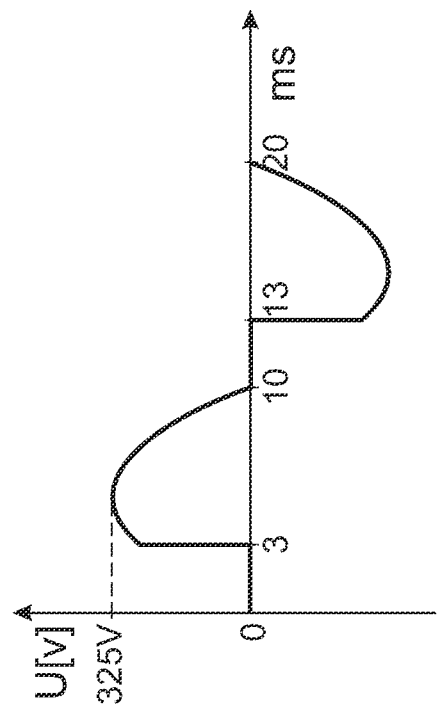
FIG. 4 shows an additional voltage profile at a phase of a second soft starter connection of a soft starter of a network according to one exemplary embodiment.

FIG. 4 shows an additional voltage profile 400 at a phase of a second soft starter connection of a soft starter of a network according to one exemplary embodiment. This may be the network with the soft starter comprising thyristors instead of diodes described in FIG. 1. According to this exemplary embodiment, it is shown how a characteristic curve with phase gating of the soft starter with thyristors looks.

Figure 5:
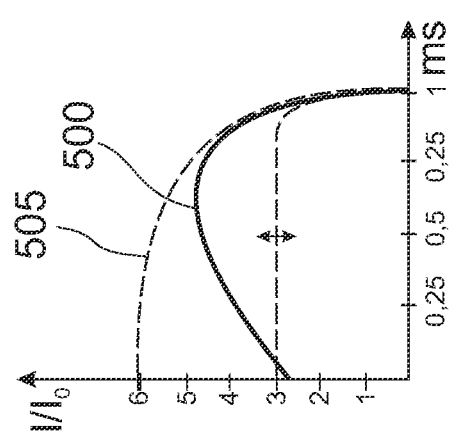
FIG. 5 shows a current profile at a phase of a second soft starter connection of a soft starter of a network according to one exemplary embodiment.

FIG. 5 shows a current profile 500 at a phase of a second soft starter connection of a soft starter of a network according to one exemplary embodiment. This may be the network with the soft starter comprising diodes described in FIG. 1. For the purpose of comparison, a further current profile 505 in the phase without a soft starter is illustrated using dashes.

According to this exemplary embodiment, in the current profile 500, a relative start-up current is 2 . . . 6×$I_0$. The current profile 500 is reduced compared to the further current profile 505 through voltage control.

Due to a motor start, a very high start-up current is caused, which cannot be supplied without further outlay. According to one exemplary embodiment of the network, a soft starter controller for the soft starter is therefore coupled to the controller of the inverter.

In this case, the approach described is suitable for all loads with an extremely high inductive load. The switch-on current for the additional drive with a soft starter is advantageously much lower than in the case of a direct motor start-up without a soft starter. The use of the soft starter is advantageous when it is not necessary to regulate the torque of the additional drive. According to one exemplary embodiment, when it is necessary to regulate the torque of the additional drive, a variable frequency drive, VFD for short, is used.

Figure 6:
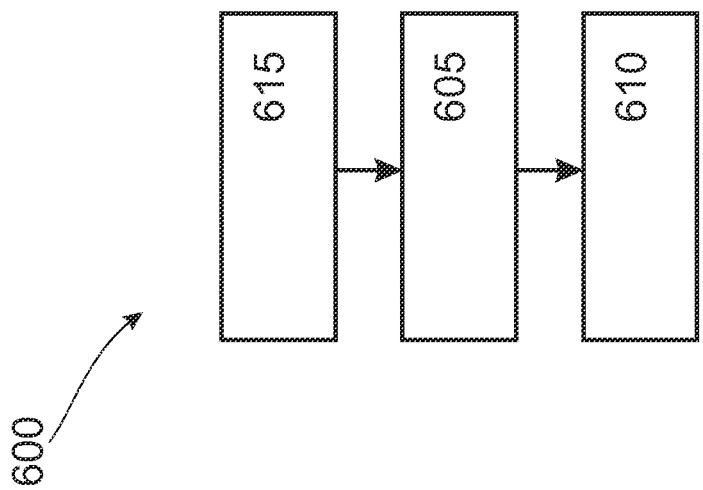
FIG. 6 shows a flowchart of a method for supplying an operating voltage for an electric vehicle according to one exemplary embodiment.

FIG. 6 shows a flowchart of a method 600 for supplying an operating voltage for an electric vehicle according to one exemplary embodiment. This may be the electric vehicle described in FIG. 1, wherein the method 600 can be actuated or carried out by the network described in FIG. 1.

The method 600 comprises a conversion step 605 and a reduction step 610. In the conversion step 605, a DC voltage applied to the first inverter connection is converted to an AC voltage and supplied at the second inverter connection. In the reduction step 610, an input voltage applied to the first soft starter connection is reduced and the operating voltage, which is reduced compared to the input voltage, is supplied at the second soft starter connection.

According to one exemplary embodiment, the AC voltage supplied at the second inverter connection in the conversion step 605 is supplied in a switchable manner at the first soft starter connection, which is electrically conductively connected to the second inverter connection. According to one exemplary embodiment, the second inverter connection is also electrically conductively connected to the energization interface in a switchable manner. In an optional step 615, the second inverter connection is therefore electrically conductively connected either only to the first soft starter connection, only to the energization interface or both to the first soft starter connection and to the energization interface. To this end, for example, suitable switches are closed or opened in step 615.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A network (105) for supplying an operating voltage (110) for an electric vehicle (100), the network (105) comprising:
   an energy supply interface (115) configured to connect the network (105) to a vehicle battery (135) and/or to a vehicle fuel cell of the electric vehicle (100);
   an inverter (120) having a first inverter connection (140) configured to connect the inverter (120) to the energy supply interface (115) and having a second inverter connection (145) configured to connect the inverter (120) to an energization interface (125) and, wherein the inverter (120) is configured to convert a DC voltage applied to the first inverter connection (140) to an AC voltage and to supply same at the second inverter connection (145);
   wherein the energization interface (125) configured to energize a unit connected to the energization interface (125); and
   a soft starter (130) having a first soft starter connection (150) configured to connect the soft starter (130) to the second inverter connection (145) and a second soft starter connection (155) configured to connect the soft starter (130) to an additional drive (160) of the electric vehicle (100), wherein the soft starter (130) is configured to reduce an input voltage applied to the first soft starter connection (150) and to supply the operating voltage (110), which is reduced compared to the input voltage, at the second soft starter connection (155).

2. The network (105) according to claim 1, further comprising a first switch (175), electrically connected between the second inverter connection (145) and the first soft starter connection (150), the first switch (175) being configured to establish and/or to disconnect an electrical connection between the inverter (120) and the soft starter (130).

3. The network (105) according to claim 2, having a second switch (177), electrically connected between the second inverter connection (145) and the energization interface (125), and being configured to establish and/or to disconnect an electrical connection between the inverter (120) and the energization interface (125).

4. The network (105) according to claim 3, having a controller (180) configured to output an opening signal (182) for opening at least one further switch(S) of the first switch (175) to electrically disconnect the first soft starter connection (150) from the second inverter connection (145) and/or to output a closing signal for closing the further switch(S) to electrically connect the first soft starter connection (150) to the second inverter connection (145).

5. The network (105) according to claim 4, wherein the first soft starter connection (150) has at least one phase having at least one anti-parallel circuit composed of two diodes (186).

6. The network (105) according to claim 5, wherein the first soft starter connection (150) has three phases each having an anti-parallel circuit composed of two diodes (186).

7. The network (105) according to claim 4, wherein the first soft starter connection (150) has at least one phase having at least one anti-parallel circuit composed of two thyristors.

8. The network (105) according to claim 7, further comprising a vehicle battery (135) and/or a vehicle fuel cell, electrically contact-connected to the energy supply interface (115).

9. The network (105) according to claim 1, wherein the energization interface (125) is electrically connected to at least one single-phase connection plug (188) and/or at least one single-phase socket.

10. The network (105) according to claim 1, wherein the energization interface (125) is electrically connected to at least one three-phase connection plug (190) and/or at least one three-phase socket.

11. The network (105) according to claim 1, further comprising an additional drive (160) for operating an additional function of the electric vehicle (100) using the operating voltage (110), wherein the additional drive (160) is electrically connectable to the second soft starter connection (155) via a drive interface (165).

12. The network (105) according to claim 11, wherein the soft starter (130) is integrated into the additional drive (160).

13. An electric vehicle (100) having the network (105) according to claim 1 and the vehicle battery (135) and/or vehicle fuel cell electrically connected to the energy supply interface (115).

14. A method (600) for supplying an operating voltage (110) for an electric vehicle (100) according to claim 13, wherein the method (600) comprises:

converting (605) a DC voltage applied to the first inverter connection (140) to an AC voltage and supplying the AC voltage at the second inverter connection (145); and reducing (610) an input voltage applied to the first soft starter connection (150) and supplying the operating voltage (110), which is reduced compared to the input voltage, at the second soft starter connection (155).

* * * * *